(12) United States Patent
Kostka et al.

(10) Patent No.: US 7,857,519 B2
(45) Date of Patent: Dec. 28, 2010

(54) COMPACT BEARING SUPPORT

(75) Inventors: Richard A. Kostka, Bolton (CA); Nasr Kenawy, Oakville (CA)

(73) Assignee: Pratt & Whitney Canada Corp., Longueuil, Québec (CA)

( * ) Notice: Subject to any disclaimer, the term of this patent is extended or adjusted under 35 U.S.C. 154(b) by 478 days.

(21) Appl. No.: 11/952,236

(22) Filed: Dec. 7, 2007

(65) Prior Publication Data

US 2009/0148274 A1 Jun. 11, 2009

(51) Int. Cl.
*F16C 27/04* (2006.01)
(52) U.S. Cl. ..................... 384/535; 384/581
(58) Field of Classification Search .................. 384/99, 384/215, 441, 535, 581
See application file for complete search history.

(56) References Cited

U.S. PATENT DOCUMENTS

| | | | |
|---|---|---|---|
| 1,561,119 A | 11/1925 | Smith | |
| 2,149,728 A * | 3/1939 | Cronan | ........................ 384/535 |
| 2,343,079 A | 2/1944 | Pickwell | |
| 2,397,700 A | 4/1946 | Sloan | |
| 2,926,541 A | 3/1960 | Adams | |
| 3,005,668 A | 10/1961 | Szydiowski | |
| 3,068,666 A | 12/1962 | Sabadash | |
| 3,261,587 A * | 7/1966 | Rowley | ...................... 415/138 |
| 3,390,546 A | 7/1968 | Jewell | |
| 3,942,847 A | 3/1976 | Parr | |
| 3,960,418 A | 6/1976 | Bracken | |
| 4,116,503 A | 9/1978 | Licht | |
| 4,203,305 A | 5/1980 | Williams | |
| 4,527,910 A | 7/1985 | Fleming | |
| 4,693,616 A | 9/1987 | Rohra et al. | |
| 4,793,722 A | 12/1988 | Jensen | |
| 5,161,940 A * | 11/1992 | Newland | ..................... 415/142 |
| 5,167,582 A | 12/1992 | Hunt | |
| 5,522,214 A | 6/1996 | Beckett et al. | |
| 5,862,706 A | 1/1999 | Chen et al. | |
| 5,895,033 A | 4/1999 | Ross et al. | |
| 6,053,922 A | 4/2000 | Krause et al. | |
| 6,682,219 B2 | 1/2004 | Alam et al. | |
| 2002/0067870 A1 * | 6/2002 | Ommundson et al. | ......... 384/99 |

* cited by examiner

*Primary Examiner*—Thomas R Hannon
(74) *Attorney, Agent, or Firm*—Ogilvy Renault LLP

(57) ABSTRACT

The compact squirrel-cage bearing support comprises a first end portion, a second end portion axially spaced from the first end portion, and a plurality of beams interconnecting the first end portion to the second end portion. The beams have a length that is greater than an axial spacing between the first end portion and the second end portion.

15 Claims, 3 Drawing Sheets

COMPACT BEARING SUPPORT

TECHNICAL FIELD

The field of invention relates generally to bearing supports.

BACKGROUND OF THE ART

Squirrel-cage bearing supports comprise a plurality of beams extending between a bearing holder end and a support base. The beams are subjected to cyclic cantilever-type deflections due to the radial forces that result from the vibration of a rotating shaft supported by the bearing. Accordingly, to ensure that the stresses induced in the beams are kept at an acceptable level and to obtain optimum dynamic properties, squirrel-cage bearing supports must be of a certain minimum axial length to accommodate an acceptable amount of radial movement of the rotating shaft. Consequently, this minimum axial length becomes a constraint in the attempt to reduce the size of gas turbine engines and minimize weight.

Accordingly, there is a need to provide a compact bearing support that can still have excellent mechanical properties.

SUMMARY

The present concept provides a compact squirrel-cage bearing support comprising: a first end portion; a second end portion axially spaced from the first end portion; and a plurality of beams interconnecting the first end portion to the second end portion, the beams having a length that is greater than an axial spacing between the first end portion and the second end portion.

The present concept also provides a self-centering bearing support comprising: a first annular member; a second annular member, the second annular member being coaxial with and spaced-apart from the first annular member; elongated beam members interconnecting the first annular member and the second annular member, each beam member extending along a path that deviates from a direction that is parallel to a central axis common to the first annular member and the second annular member.

The present concept further provides a resilient bearing support comprising: a fixed end portion; a free end portion coaxial with the fixed end portion, the free end portion being configured and disposed to receive a bearing therein; a plurality of elongated members located between the fixed end portion to the free end portion, each elongated member being connected to the fixed end portion at a first respective location and to the free end portion at a second respective location, the first and second locations being angularly offset from each other with reference to a central axis.

Further details of these and other aspects of the concept will be apparent from the detailed description and figures included below.

DESCRIPTION OF THE DRAWINGS

Reference is now made to the accompanying figures, in which.

DETAILED DESCRIPTION OF THE PREFERRED EMBODIMENTS

Figure 1:
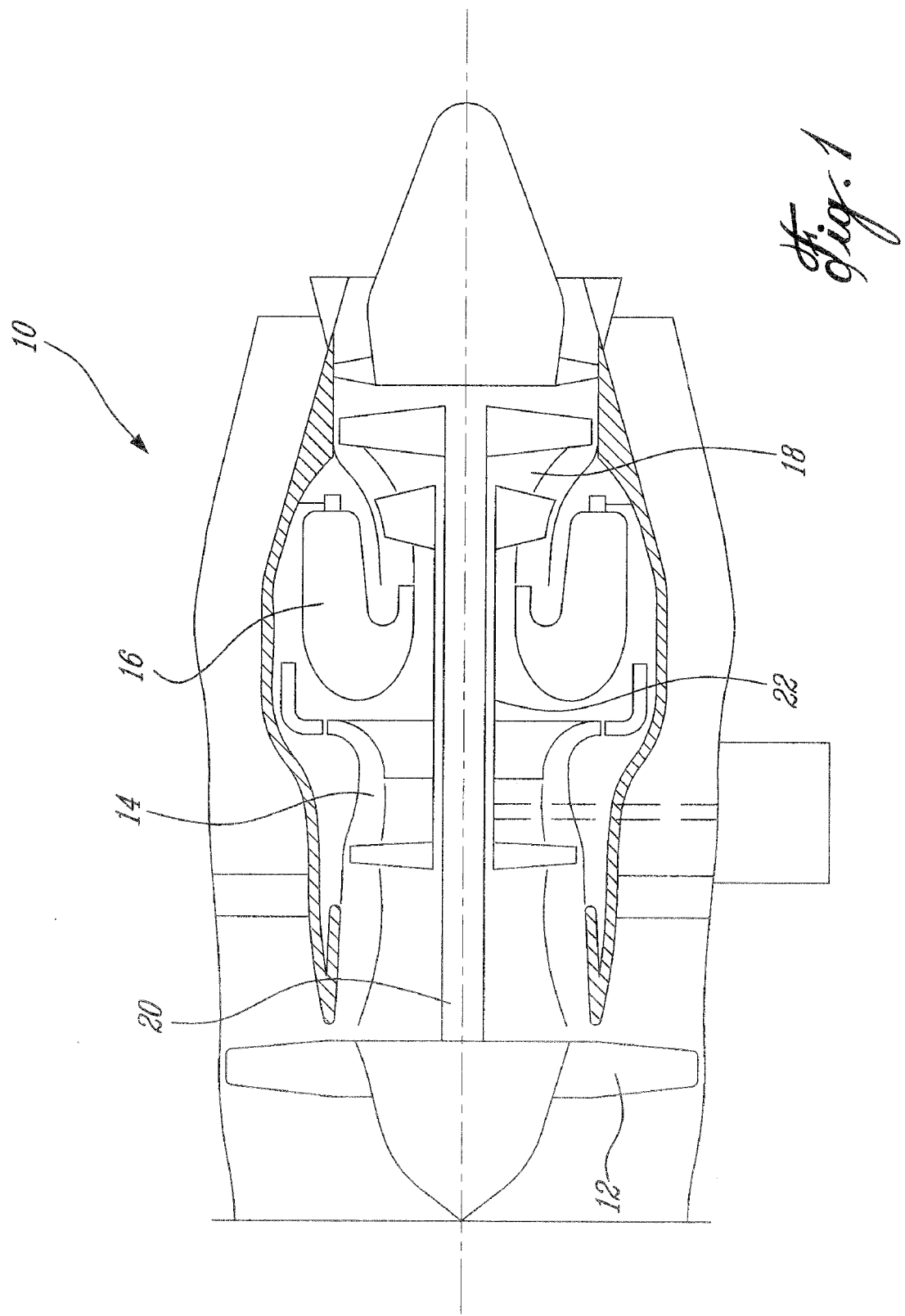
FIG. 1 is a schematic axial cross-section view showing an example of a gas turbine engine.

FIG. 1 illustrates an example of a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. The gas turbine engine 10 comprises a concentric shaft system which supports major rotating assemblies within the gas turbine engine 10. The concentric shaft system comprises an inner shaft 20 and an outer shaft 22 which are rotatably secured to a stationary portion of the gas turbine engine 10 via bearings (not shown). This figure illustrates a possible environment for the bearing support.

Figure 2:
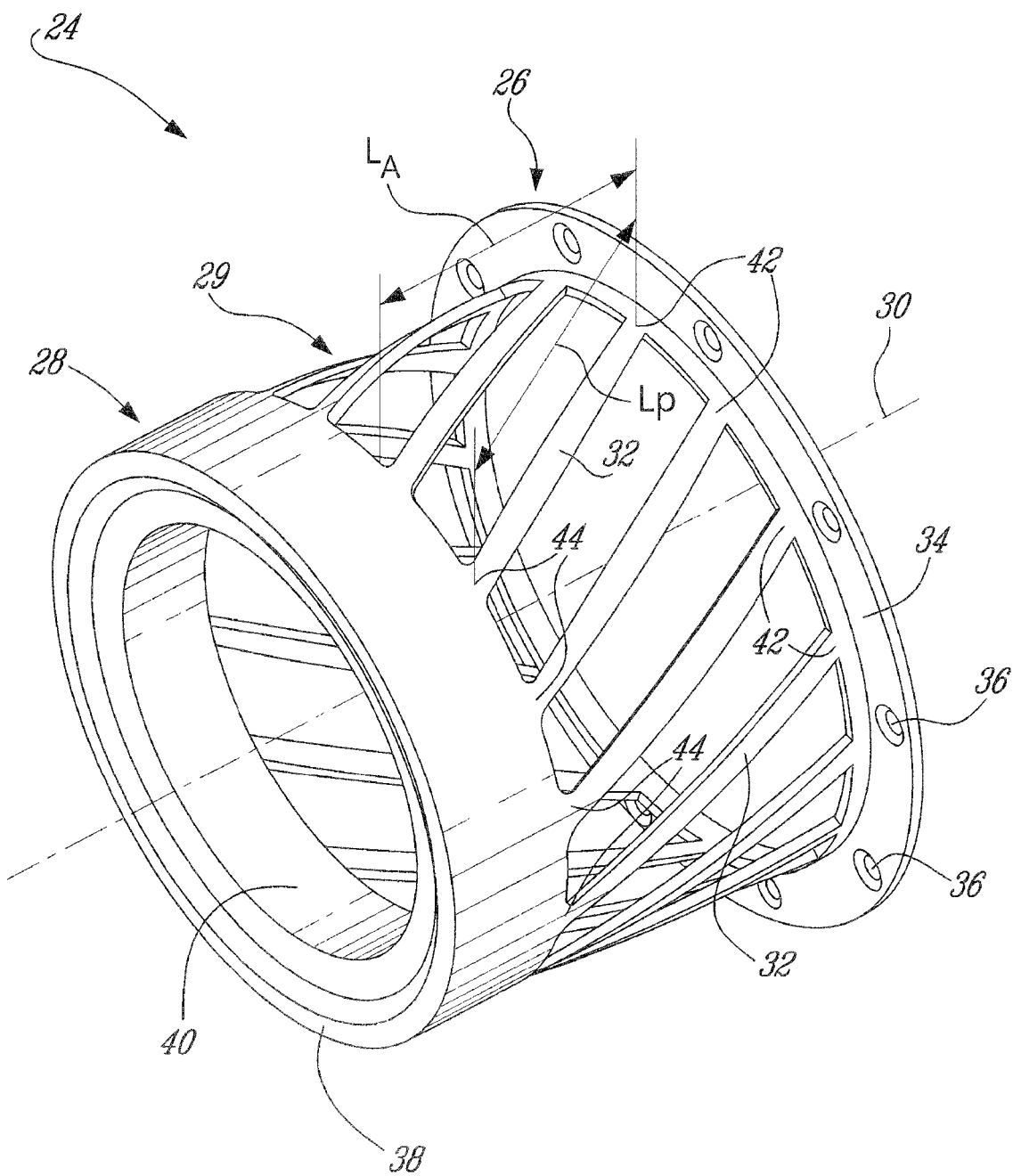
FIG. 2 is an isometric view of an example of the present squirrel-cage bearing support.

FIG. 2 shows an example of an improved bearing support, generally shown at 24, according to the present concept. The bearing support 24 is of squirrel-cage type and is used to hold a bearing. The bearing support 24 comprises a fixed end portion 26, a free end portion 28 disposed at a distance from the fixed end portion 26 along a central axis 30, and a cage portion 29 which interconnects the fixed end portion 26 to the free end portion 28. The fixed end portion 26 and the free end portion 28 have an annular configuration. The cage portion 29 comprises a plurality of elongated members or beams 32 extending between the fixed end portion 26 and the free end portion 28. Each beam 32 has a path length $L_P$ that is greater than its axial length $L_A$ along the central axis 30. The axial length $L_A$ also corresponds to an axial spacing between the fixed end portion 26 and the free end portion 28.

The fixed end portion 26 may be used to secure the bearing support 24 to a stationary portion of the gas turbine engine 10. Alternatively, the bearing support 24 could also be adapted and used for rotatably connecting a first rotating shaft to a second shaft rotating at a different speed or in an opposite direction. The fixed end portion 26 comprises an outwardly extending flange 34 having an array of mounting holes 36 axisymmetrically distributed on the flange 34 about the central axis 30. The free end portion 28 comprises an annular support region 38 in which a bearing 40 may be received and supported. The annular support region 38 may also be adapted to support a conventional squeeze film damper (not shown). The fixed end portion 26 and the free end portion 28 are disposed coaxially and have an annular configuration so as to permit a shaft to extend through the bearing support 24 along the central axis 30.

In order to obtain a path length $L_P$ that is greater than the axial length $L_A$, the beams 32 extend along a path that deviates from a direction that is parallel to the central axis 30. Specifically, in the example shown in FIG. 2, the beams 32 are shown to follow a helical path about the central axis 30. Each beam 32 is connected to the fixed end portion 26 at a first respective location 42 and to the free end portion 28 at a second respective location 44. The first locations 42 and their respective second locations 44 are angularly offset from each other about the central axis 30.

Figure 3:
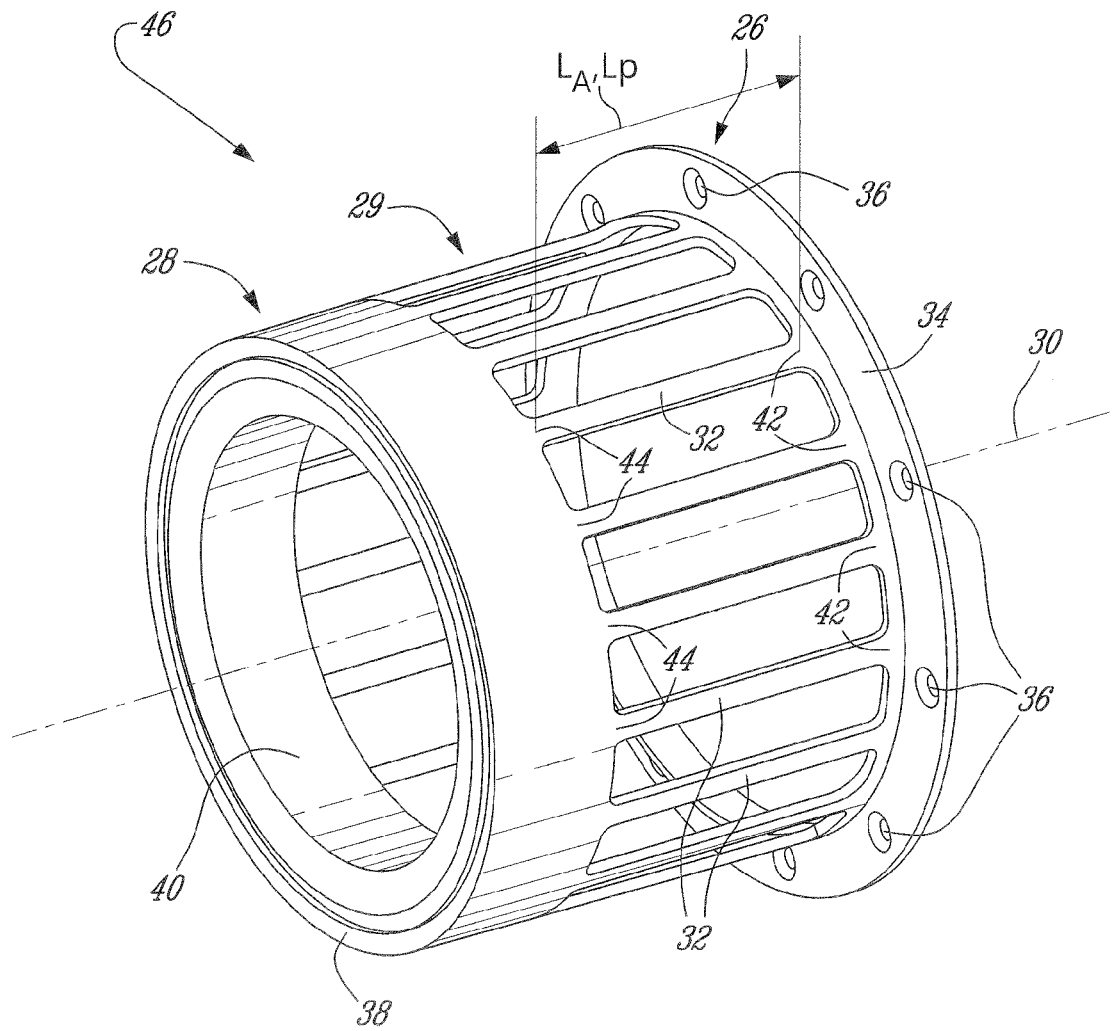
FIG. 3 is an isometric view of a bearing support according to the prior art.

FIG. 3 shows a bearing support, generally shown at 46, in accordance with the prior art. In this configuration the beams 32 extend between the fixed end portion 26 and the free end portion 28 along a path that is parallel to the central axis 30. Accordingly, in this case the axial length $L_A$ of the beams 32 equals the path length $L_P$ of the beams 32.

Referring back to FIG. 2, the bearing support 24 allows for resilient radial movement of the bearing 40 in response to radial forces that are induced by the vibrations of the rotating shaft. The bearing support 24 also provides a self-centering support for the bearing 40. In response to the vibrations of the rotating shaft, the beams 32 are repeatedly deflected in a cantilever manner. The minimum length of the beams is calculated in order to accommodate a certain allowable amount of radial movement of the rotating shaft and also to maintain an acceptable level of stress within the beams 32.

In the case of a simple cantilever beam of a given cross-section, the magnitude of the bending stress in the beam for a given amount of deflection at the free end of the beam is a function of the length of the beam wherein a greater length results in a lower magnitude of stress in the beam for a given amount of deflection.

The bearing support 24 may be fabricated using conventional manufacturing processes and a suitable material or combination of materials selected based on the specific application. The bearing support 24 may be produced as a single one-piece component using conventional machining techniques. For example, the beams 32 on the bearing support 24 may be formed by machining slots from a single workpiece and the end portions are machined on the same workpiece.

Depending on the dynamic properties desired, the bearing support 24 may comprise a combination of one or more beams 32 extending along an axial path and one or more beams extending along a helical path. The cross-section, angular spacing, desired path and number of beams 32 may be selected based on factors such as material properties, operating conditions and dynamic properties desired for the bearing support 24. Accordingly, conventional numerical simulation and modeling techniques commonly used in the art may be used to determine a suitable design configuration of the bearing support 24. It is also apparent that the requirements regarding dynamic properties of the bearing support 24 may differ whether a squeeze film damper is used or not.

The above description is meant to be exemplary only, and one skilled in the art will recognize that changes may be made to the embodiments described without departing from the scope of the invention disclosed. For example, it is apparent that the bearing support may also be used in a machine other than gas turbine engines and that the specific geometric configuration of the fixed end portion 26, free end portion 28 and the beams 32 may be different from what is shown and described. Still other modifications which fall within the scope of the present invention will be apparent to those skilled in the art, in light of a review of this disclosure, and such modifications are intended to fall within the appended claims.

What is claimed is:

1. A compact squirrel-cage bearing support comprising:
   a first end portion;
   a second end portion axially spaced from the first end portion; and
   a plurality of beams interconnecting the first end portion to the second end portion, the beams having a length that is greater than an axial spacing between the first end portion and the second end portion, each of the beams extending along a respective helical path.

2. The bearing support as defined in claim 1, wherein each beam is connected to the first end portion at a first respective location and to the second end portion at a second respective location, the first and second locations being angularly offset from each other about a central axis.

3. The bearing support as defined in claim 1, wherein the first and second end portions are coaxial with a central axis, the beams being axisymmetrical about the central axis.

4. The bearing support as defined in claim 1, wherein all beams have the same length.

5. A self-centering bearing support comprising:
   a first annular member;
   a second annular member, the second annular member being coaxial with and spaced-apart from the first annular member, the first annular member and the second annular member having similar outer diameters;
   elongated beam members interconnecting the first annular member and the second annular member to form a generally cylindrical body therewith, each beam member extending along a path that deviates from a direction that is parallel to a central axis common to the first annular member and the second annular member.

6. The bearing support as defined in claim 5, wherein at least one of the beam members has a helical shape.

7. The bearing support as defined in claim 5, wherein the beam members are axisymmetrically distributed on the first and second annular members.

8. The bearing support as defined in claim 7, wherein all beam members have a same length.

9. The bearing support as defined in claim 5, wherein each beam member is connected to the first annular member at a first respective location and to the second annular member at a second respective location, the first and second locations being angularly offset from each other about the central axis.

10. The bearing support as defined in claim 9, wherein the beam members are equally spaced from one another.

11. A resilient bearing support comprising:
    a fixed end portion;
    a free end portion coaxial with the fixed end portion, the free end portion being configured and disposed to receive a bearing therein, the fixed portion and the free end portion having similar outer diameters;
    a plurality of elongated members located between the fixed end portion to the free end portion to form a generally cylindrical body therewith, each elongated member being connected to the fixed end portion at a first respective location and to the free end portion at a second respective location, the first and second locations being angularly offset from each other with reference to a central axis.

12. The bearing support as defined in claim 11, wherein each elongated member extends along a respective helical path.

13. The bearing support as defined in claim 11, wherein the elongated members are evenly distributed about the central axis.

14. The bearing support as defined in claim 11, wherein the fixed end portion is connected to a component of a gas turbine engine.

15. The bearing support as defined in claim 11, wherein the support is made from a single workpiece machined into a final shape where both end portions and the elongated members are made integral with each other.

* * * * *